United States Patent [19]
Roberti et al.

[11] 3,785,802
[45] Jan. 15, 1974

[54] METHOD FOR EXTRACTING AND SEPARATING IRON AND NON-FERROUS METALS, FROM FERROUS MATERIALS

[75] Inventors: Giorgio Roberti, Rome; Casimiro Dufour-Berte, Genoa; Edoardo Pasero, Rome, all of Italy

[73] Assignee: Centro Sperimental Metallurgico S.p.A., Rome, Italy

[22] Filed: Jan. 18, 1971

[21] Appl. No.: 106,962

[30] Foreign Application Priority Data
Jan. 19, 1970 Italy.................................. 12431/70

[52] U.S. Cl............................... 75/26, 75/33, 75/82
[51] Int. Cl............................................ C21b 15/04
[58] Field of Search .................... 75/0.5, 1, 82, 26, 75/33, 35

[56] References Cited
UNITED STATES PATENTS

| | | | |
|---|---|---|---|
| 3,323,903 | 6/1967 | O'Neill | 75/26 |
| 2,948,525 | 8/1960 | West | 75/33 |
| 2,612,440 | 9/1952 | Altmann | 75/82 |
| 2,835,557 | 5/1958 | West | 75/82 |
| 2,850,377 | 9/1958 | Townshend | 75/82 |
| 3,252,791 | 5/1966 | Frysinger | 75/82 |
| 3,499,754 | 3/1970 | Colombo | 75/26 |

*Primary Examiner*—L. Dewayne Rutledge
*Assistant Examiner*—Peter D. Rosenberg
*Attorney*—Robert E. Burns

[57] ABSTRACT

The invention consists in a method for extracting and separating iron from non-ferrous metals from ferrous ores and similar ferrous materials of such a pyrite ashes and/or purple ores, powders recovered from the steelmaking oxygen converter fumes and the like. The method comprising a first step wherein the material is reduced to an iron sponge preferably by means of hydrogen and similar reducing gases; a second step wherein said iron sponge is treated with carbon monoxide so as to obtain ferrocarbonyl vapors and a carbonylation solid residue with a higher concentration of non-ferrous metals; a third step consisting in the treatment of the ferrocarbonyl vapors on one side and then of the carbonylation solid residue; wherein the ferrocarbonyl vapors are condensed and then dissociated into pure iron powder and carbon monoxide which is used again in said second step, and wherein the residual carbonylation solid is treated to extract and recover the non ferrous metals contained therein.

9 Claims, 1 Drawing Figure

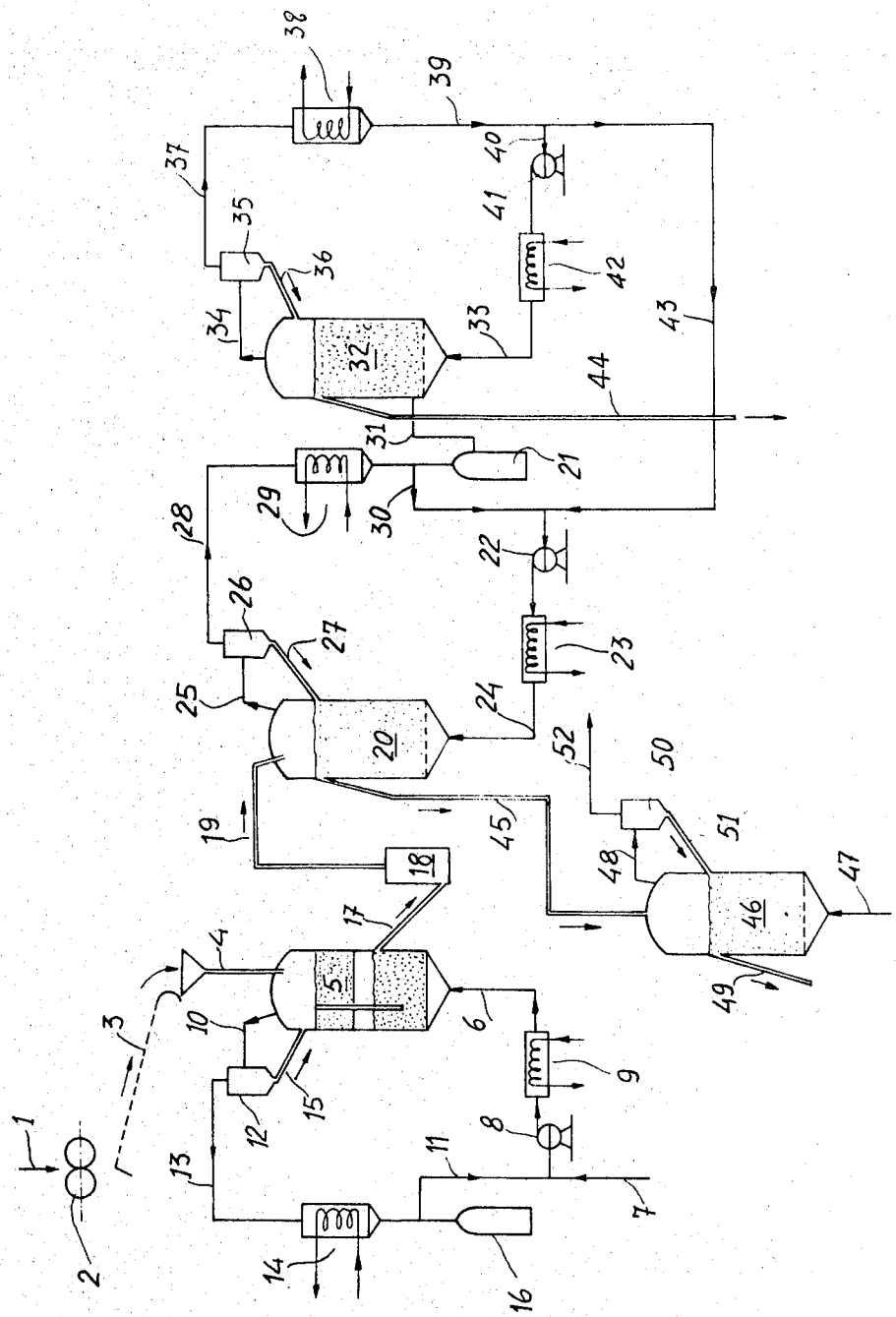

A METHOD FOR EXTRACTING AND SEPARATING IRON AND NON-FERROUS METALS, FROM FERROUS MATERIALS

BACKGROUND OF THE INVENTION

The present invention consists of a method for exploiting purple ores and/or pyrite ashes and iron ores containing varying contents of non-ferrous metals.

It is well known that the ashes obtained after roasting pyrite concentrates of various origins often contain, together with iron oxide, variable quantities of other elements such as copper, zinc, lead and sometimes traces of silver and gold. Some iron ores too, particularly when of hydrothermal or pneumatolytic origin, contain variable quantities of copper,, zinc and other metals in form of sulphides, complex sulphides or oxides.

Other ferrous materials often containing copper, zinc, etc., are the powders recovered from the smokes of oxygen converters for steel production (ZnO 0.70 percent; Cu 0.03 percent by weight) which are increasingly available in present steel plants.

The utilization of such ferrous materials in the steel making industry is of little interest as the accompanying elements pass nearly completely into the iron and steel, with quite harmful consequences affecting deleteriously the mechanical characteristics of products made therewith.

Heretofore, many purification methods have been devised and embodied on industrial scale, said methods consisting of removing said non-ferrous metals and leaving available purified iron oxides.

The methods, up to now devised, may be divided in two classes: hydrometallurgical methods and high-temperature vaporization methods. Both methods are based on the principle of attacking and selectively transforming the non-ferrous metal oxides into salts (chlorides or sulphates), while the iron remains in the original state of oxide. Then, through leaching or volatilizing, said non-ferrous salts are separated from the iron oxide whose utilization in the steel industry is now permissible.

However, the above methods have the disadvantage of being economically achievable only when the metal contents in the ashes or ores are above a minimum value, for instance 0.7% to 1.0% of Cu+Zn. However these elements are dangerous in the pig iron production even when they are present in lower percentages, such as for instance 0.08% to 0.20%.

Therefore, there are types of pyrite ashes or other iron ores the use of which is made quite difficult by intermediate contents of non-ferrous metals and which therefore remain practically unused.

SUMMARY OF THE INVENTION

The present invention has for its object a method permitting the utilization of said intermediate pyrite ashes and other iron ores. More particularly, said method according to the present invention consists of removing the iron from the above-mentioned ferrous materials and thus leaving a gangue containing the non-ferrous metals, thus increasing the concentration of the non-ferrous metals remaining in said gangue.

The method according to the present invention comprises reducing, preferably by hydrogen, in a fluidized bed reactor, the above ferrous materials, obtaining a preferably pyrophoric iron sponge. Such a sponge is treated by carbon monoxide under pressure, preferably in a fluidized bed, at a temperature ranging from 140° to 170°C, and at pressures varying from 30 to 50 atmospheres. The metallic iron present reacts with the carbon monoxide to form ferropentacarbonyl which, under said pressure and temperature conditions, vaporizes and distils and is then taken away as a gas. Said ferropentacarbonyl may be industrially used in various ways. In a preferred embodiment it may be dissociated, preferably in a fluidized bed, at a temperature of 250°–300°C and pressure of 5–20 atmospheres, with consequent production of iron powder and recovery of the carbon monoxide. This recovered carbon oxide is then recycled, while said iron powder is used in powder or melting metallurgy. The iron obtained by the above process has the highest characteristics of purity, as it is separated from the gangue through distillation as a volatile product in a very selective manner. The non volatile residue of said carbon monoxide treatment may be then suitably treated for obtaining the non-ferrous metals present therein, whose concentration has in the meantime been increased in relation to the removed quantity of iron and oxygen.

The preferred methods for recovering the non-ferrous metals present in said residue are those consisting of roasting by chlorine, roasting by sodium chloride or calcium chloride, acid dissolution and so on.

The roasting by chlorine consists of treating the carbony-lation residue in a fluidized bed reactor with chlorine and air, thus obtaining volatile chlorides of copper, zinc etc., which are separated by condensation.

The roasting by sodium chloride or calcium chloride consists of treating said residue in a fixed bed reactor e.g., in a shaft furnace, with sodium or calcium chloride, so as to obtain chlorides of copper, zinc and so on.

The acid dissolution consists of directly said leaching said residue, e.g., with sulphuric acid, so as to obtain a solution of zinc, copper or the like salts, e.g., sulphates, the copper and zinc being separated from said solution by precipitation with Fe.

DESCRIPTION OF THE PREFERRED EMBODIMENT

The various features and variations of the method concerned will more clearly appear in the following examples which are not to be considered as limiting the present invention.

Example 1

The starting material consists of pyrite ashes with an average composition as shown in the following table:

TABLE NO. 1

Fe — 58.5%
$SiO_2$ — 6.5%
CaO — 2.8%
MgO — 1.2%
Mn — 0.5%
S — 1.6%
P — 0.4%
Zn — 0.3%
Cu — 0.2%

With reference to the diagram of the FIGURE, the purple ashes 1 are ground in a mill 2 and screened in a sieve 3 up to a granulometry of 0.1 to 2 mm., thus obtaining a material suitable to undergo a treatment in a fluidized bed. Such a preparation is not necessary should the pyrite ashes come from roasting in a fluidized reactor.

The material so prepared, the iron content of which is present substantially as hematite, is continuously fed through line 4 to a fluidized bed reduction reactor 5, possibly consisting of two steps in cascade. The fluidizing and at the same time reducing agent is hydrogen from source 7 and introduced at bottom of reactor 6. The hydrogen is compressed and preheated in compressor 8 and exchanger 9 respectively. In said reaction vessel 5 the temperature is at 550°C and the pressure at 30 atmospheres. Under said conditions the reduction reaction speed is sufficiently high owing to the high operative pressure, while the relatively low reduction temperature favours the formation of a pyrophoric iron sponge that is having high characteristics of surface reactivity.

The outgoing hydrogen issuing to 10 is recycled to said reactor through line 11 after having passed through cyclone 12 and, by means of conduit 13, through cooler 14. In said cyclone and cooler the hydrogen is purified from powder which is returned via line 15 and water 16 respectively, said water being produced by the reduction reaction. The hydrogen quantity corresponding to the stoichiometric consumption, is fed again to the circuit through line 7.

The iron sponge obtained in the reduction reactor contains obviously all the accompanying elements present in the pyrite ashes. Such a sponge, is discharged from said reactor by continuous overflowing via line 17 and stored in an inert atmosphere in lung 18, is fed continuously, through conduit 19, to a carbonylation reactor 20 under pressure, said reactor also working in a fluidized phase. The fluidizing agent is carbon monoxide with the addition of small percentage (2-5 percent) of gaseous ammonia, said agent, compressed in a compressor 22 and pre-heated in exchanger 23, being blown from the reactor bottom through conduit 24.

Inside said reactor 20 the temperature is maintained at 170°C and the pressure at 50 atmospheres. Under said conditions and owing to the catalyzing action of the ammonia present therein, said carbon monoxide combines with the metallic iron present in said sponge, thus causing the formation of ferropentacarbonyl, $Fe(CO)_5$ which, under said conditions, is in the vapour phase and is swept away by the upward current of CO. Such a current 25 passes through a cyclone 26 where powders deposit and are then recycled via 27 into the reaction vessel 20. The current of CO and $Fe(CO)_5$ by means of line 28 are led to condenser 29 wherein takes place the separation of the carbon monoxide 30 as the gaseous phase from the ferropentacarbonyl as the liquid phase, the latter collecting into container 21. Said carbon monoxide is recycled to the carbonylation reactor 20, while said ferropentacarbonyl is conveyed either to ether utilization or to the fluidized-bed dissociation continuous reactor 32 through line 31.

In the dissociation reactor 32, said ferropentacarbonyl is sprayed into an iron powder bed kept in the fluidized state by a carbon monoxide current entering at the bottom 33 of reactor 32. Inside said reactor 32 the temperature is maintained at 270°C and the pressure at 10 atmospheres. The continuously fed ferropentacarbonyl vaporizes and dissociates in reactor 32, depositing the iron on the particles forming the bed or forming new particles, while the carbon monoxide deposited from the dissociation joins the fluidizing carbon monoxide current leaving said reactor through line 34. The powders contained in the gaseous current are deposited in cyclone 35 and recycled into the dissociation reactor through line 36, or are recovered separately.

From cyclone 35 said gaseous carbon monoxide current moves to the recycles through lines 37 and 39, passing through cooler 38.

The carbon monoxide necessary to the fluidization is recycled to the dissociation reactor 32 through line 40, compressor 41 and pre-heater 42. The quantity of carbon monoxide developed from the ferrocarbonyl dissociation is removed from the circuit and fed, through lines 43 and 24, to sponge carbonylation apparatus 20, thus reducing the carbon oxide consumption of the whole operation cycle to only the amount lost for discharges and flushings of the circuits.

The produced iron powder removed via duct 44 is removed from dissociation reactor 32 by continuous overflowing and conveyed to be used for high quality steel products, as e.g., sinterization or special casting metallurgy (melting stocks and the like). The residual non-ferrous solid material from carbonylation is taken out of said reactor 20 by continuous overflowing through line 45.

In said residual material the percentages of all the accompanying elements originally present in the pyrite ashes (Cu,Zn,Pb,Sb and so on) are strongly increased, as iron and oxygen have been substantially removed from the starting material.

The carbonylation residue is then fed via line 45 to a continuous reactor for chlorine roasting in a fluidized bed 46, wherein the fluidizing current 47 is air containing a small percentage (from 2 percent to 5 percent) of gaseous chlorine; the temperature in said reactor being maintained around 800°–900°C.

Under such conditions, the chlorine combines with the zinc and copper present, causing the formation of volatile chlorides which are removed by current 48, while the tailing is taken away by overflowing at 49. Said volatile chlorides, after being separated by means of cyclone 50 and conduit 51 from the powders, are fed, through line 52, into condensing devices (not shown) where they are recovered. The recovering yield based on initial content is above 95 percent for the copper and above 90 percent for the zinc.

EXAMPLE 2

The starting material is an iron ore containing, besides the gangue, small percentages of accompanying elements which render it poorly suitable to conventional iron and steel utilizations; the average composition of said material is the following:

TABLE NO. 2

Fe — 55.5%
$SiO_2$ — 5.1%
$CaO_2$ — 4.2%
MgO — 1.2%
Mn — 2.1%
S — 0.07%
P — 0.6%
Cu — 0.2%
Zn — 0.1%
Pb — 0.1%
Ti — 0.1%

Said material is ground and screened within a granulometric interval suitable to undergo a treatment in a fluidized bed and then to be subjected to the reduction and carbonylation as in Example 1.

The carbonylation residue from duct 45 is mixed with sodium chloride in a percent of about 10 percent and then fed to a fixed bed roasting reactor (e.g., a shaft furnace), (not shown) the temperature of which is kept at about 600°C. Under such conditions the non ferrous metals present therein react with the sodium chloride, causing the formation of soluble chlorides.

The roasted product is then conveyed to a leaching installation the metals, whose recovery is of interest, are separated from the gangue and extracted in solution.

The liquid ferrocarbonyl issuing at 25 and coming from the carbonylation of the reduced material is used as in the previous example.

Although the present invention in its preferred modes has been described and shown in the appended examples by way of example only, many modifications and changes may be made in embodying the invention, in accordance with art recognized equivalents.

What is claimed is:

1. A method of recovering iron from iron-bearing ores and iron-bearing starting materials which comprises the steps of:
   a. Contacting the starting material, in particulate form, in a first fluidized-bed reducing reactor maintained at a temperature in the range 400°–600°C and pressurized in the range 10–30 atmospheres with a reducing gas as fluidizing medium to reduce said starting material to a pyrophoric sponge;
   b. Cooling and transferring said pyrophoric sponge to a second fluidized-bed carbonylation reactor;
   c. Treating said pyrophoric sponge in said carbonylation reactor, maintained in fluidized form at a temperature in the range 130°–170°C and at a pressure of 30–50 atmospheres, with carbon monoxide to convert substantially all the iron present in said pyrophoric sponge to the volatile ferrocarbonyl compound;
   d. Distilling said ferrocarbonyl compound from said carbonylation reactor and leaving in said carbonylation reactor a solid non-ferrous particulate residue;
   e. Removing the solid particulate, non ferrous residue from said second carbonylation reactor to treatment vessels wherein the non-ferrous values of said residue are treated and recovered;
   f. Condensing said distilled ferrocarbonyl compound and introducing the condensate into a third dissociation reactor wherein said ferrocarbonyl compound is dissociated to form particulate iron and carbon monoxide;
   g. Recycling the carbon monoxide from said third dissociation reactor to said second carbonylation reactor;
   h. Removing and recovering the particulate iron from the dissociation reactor.

2. The process according to claim 1 wherein said reducing gas in said reducing reactor is hydrogen.

3. The process according to claim 1 wherein the carbon monoxide in said carbonylation reactor is catalyzed with gaseous ammonia.

4. The method according to claim 1 wherein the dissociation reactor is a fluidized-bed reactor of metallic iron particles resulting from the dissociation reaction and is maintained at a temperature of 250°–300°C and at a pressure in a range of 1–10 atmospheres by the carbon monoxide resulting from the dissociation.

5. The method according to claim 1 wherein the pyrophoric sponge obtained in step (a) is maintained under inert conditions during step (b) until it is introduced into the carbonylation reactor.

6. The method according to claim 1 wherein the particle size range of said starting material is in the range of 0.1 to 0.5mm.

7. The method according to claim 1 wherein the solid particulate residue is treated according to step (e) with an acid leach treatment to extract the non-ferrous metal values contained therein.

8. The method according to claim 1 wherein the solid particulate non-ferrous residue in step (e) is treated in a fluidized-bed reactor in the presence of a halogen or halide compound to form an acid-soluble intermediate halide compound of said nonferrous values.

9. The method according to claim 1 wherein said iron bearing ores and starting materials are selected from the group consisting of pyrite ashes, purple ores, condensed powdered steelmaking oxygen-convertor fumes, iron oxide ores contaminated with deleterious amounts of copper and zinc.

* * * * *